United States Patent [19]
McNaught

[11] 4,373,537
[45] Feb. 15, 1983

[54] GRAIN SEPARATING APPARATUS

[75] Inventor: James B. McNaught, St. Germain-en-Laye, France

[73] Assignee: Massey-Ferguson Services N.V., Curacao, Netherlands Antilles

[21] Appl. No.: 297,693

[22] PCT Filed: Dec. 19, 1980

[86] PCT No.: PCT/GB80/00222
§ 371 Date: Aug. 31, 1981
§ 102(e) Date: Aug. 31, 1981

[87] PCT Pub. No.: WO81/01939
PCT Pub. Date: Jul. 23, 1981

[51] Int. Cl.³ .............. A01F 7/00; A01F 12/00; B02C 21/00
[52] U.S. Cl. .................. 130/27 R; 130/27 F; 130/DIG. 6; 241/190; 56/16.4; 56/466
[58] Field of Search .......... 130/27 F, 27 R, DIG. 4, 130/DIG. 6, 27 E; 56/16.4–16.6, 466, 472; 209/369, 389, 355, 627, 642, 654, 352; 241/190, 189 R

[56] References Cited

U.S. PATENT DOCUMENTS

| | | | |
|---|---|---|---|
| 1,181,360 | 5/1916 | Walsh | 209/352 |
| 2,213,906 | 9/1940 | Eberson | 241/190 |
| 3,186,460 | 6/1965 | Frederick | 241/190 |
| 3,324,860 | 6/1967 | Kepkay | 130/27 R |
| 3,815,823 | 6/1974 | Johnson | 241/190 |

*Primary Examiner*—Gene Mancene
*Assistant Examiner*—John Weiss
*Attorney, Agent, or Firm*—Robert L. Farris

[57] ABSTRACT

Apparatus for recovering grain from a mixture of grain and straw in a combine harvester capable of conveying the mixture to a cute arranged at the discharge end of the conveyor. From the cute the mixture is carried to a trough covered by a grille at the lower end of the cute. Grain is then collected by the trough and the straw passes over it with the aid of a rotor located at the rear end of the cute. The rotor is adjustable towards any away from the chute to vary the space therebetween for different types of crops and crop conditions.

11 Claims, 3 Drawing Figures

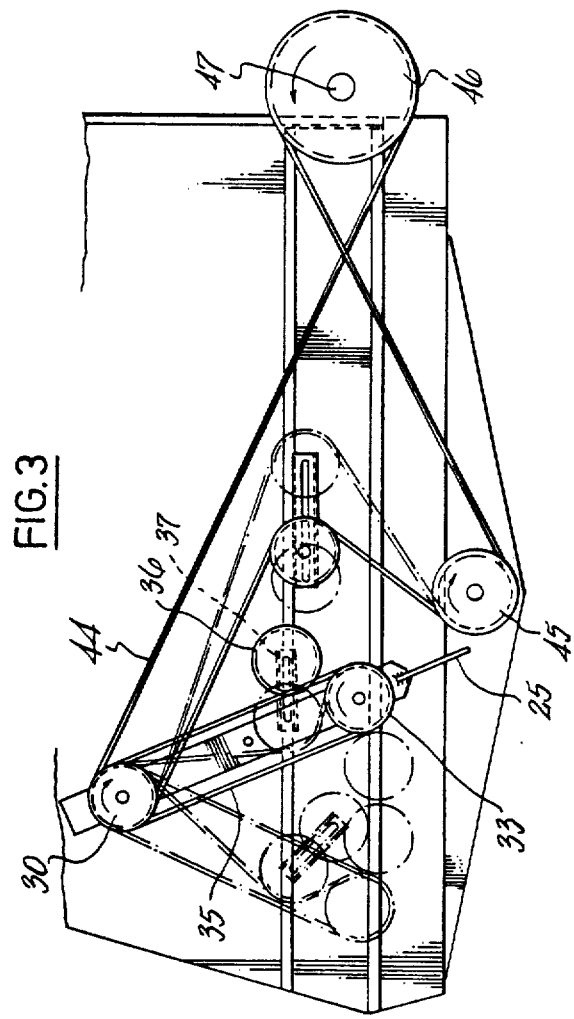

GRAIN SEPARATING APPARATUS

TECHNICAL FIELD

This invention relates to apparatus for recovering grain from a mixture of grain and straw in a combine harvester.

In our U.K. Pat. No. 1 101 431 we proposed apparatus comprising a conveyor capable of conveying a mixture of grain and straw in a generally horizontal direction to a discharge end, and a chute arranged so that said mixture discharged from the conveyor falls onto the chute. The chute has a floor that is imperforate to the passage of grain through it and is downwardly inclined and projects beyond said discharge end in the feeding direction of the conveyor. A trough covered by a grille is provided at or adjacent to the lower end of the chute, and is adapted so that when the mixture of grain and straw passes down the chute, grain is collected by the trough and straw passes over it. A rotor is provided above and adjacent the rear end of the chute and is driven so as to assist the discharge of material from the apparatus.

It has been found that this known apparatus increases the efficiency of a combine harvester by increasing the amount of grain separated from the straw. However, it has also been found that the efficiency of this apparatus is reduced when harvesting bulky crops, such as rape and beans, that tend to form an entangled mass which accumulates above the rotor and can block the combine separating mechanism. The object of the present invention is to modify this known apparatus so that it can handle these bulky crops, thereby increasing grain separation efficiency and the crop flexibility of the combine to which it is fitted.

DISCLOSURE OF THE INVENTION

According to the present invention, the aforesaid known apparatus is modified by mounting the rotor adjacent the lower end of the chute so that it is adjustable towards and away from the chute to vary the space therebetween for different types of crop and crop conditions.

In a preferred embodiment, the rotor is carried between the lower ends of a pair of downwardly extending arms that are pivotally supported at their upper ends so as to allow the rotor to be swung backwards and forwards between a number of different settings.

Preferably, the rotor drive mechanism comprises an adjustment arm which is mounted alongside one of the rotor support arms so as to pivot with said arm about the same upper pivot axis and which carries an upper drive pulley or wheel that is rotatable about said upper pivot axis and a lower drive pulley or wheel that is rotatable about the axis of the rotor, the two drive pulleys or wheels being coupled so that an input drive to the upper pulley serves to drive the lower pulley, and a releasable drive coupling being provided between the lower pulley and the rotor.

It will be appreciated that the releasable drive coupling is the only drive component that needs to be disengaged to allow adjustment of the rotor. The input drive to the upper pulley can remain permanently engaged because its position is fixed at the upper pivot axis of the rotor support arms. Further, the coupling of the adjustment arm with the rotor support arms ensures that the lower pulley remains in axial alignment with the rotor for reengagement of the releasable drive coupling in any rotor setting.

Preferably, the releasable drive coupling takes the form of an axially insertable spindle that keys the lower pulley and rotor together.

The adjustment arm itself forms a convenient means for adjusting the setting of the rotor and is preferably formed with a grip or handle at its lower end.

DESCRIPTION OF THE DRAWINGS

The invention is now described by way of example with reference to the accompanying drawings in which:

FIG. 3 is an elevation of the opposite side of the combine harvester to that shown in FIG. 1.

BEST MODE OF CARRYING OUT INVENTION

Figure 1:
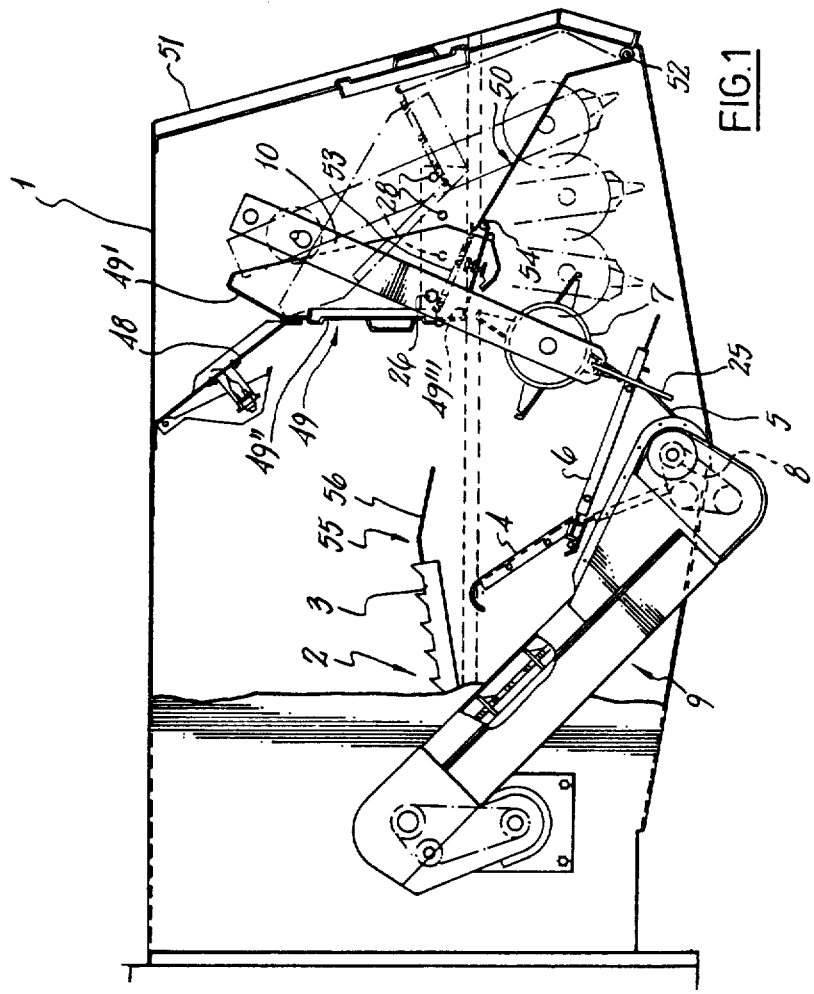
FIG. 1 is a side elevation of a combine harvester fitted with grain recovering apparatus according to the invention.
Figure 2:
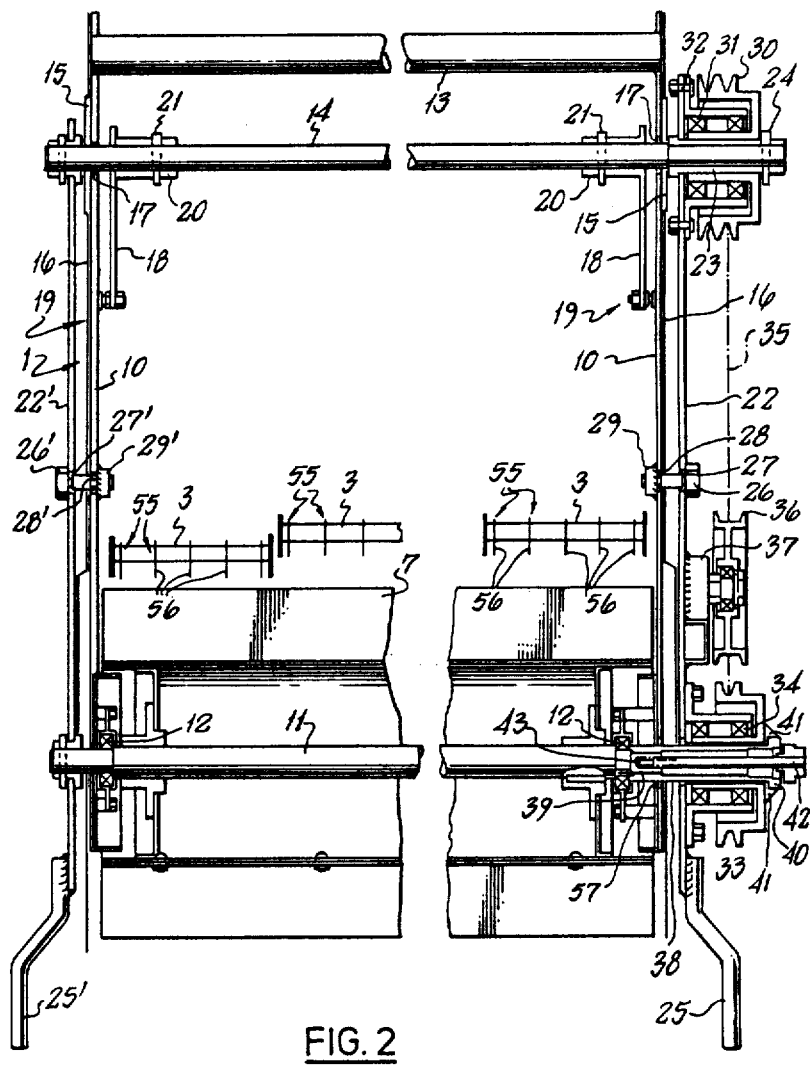
FIG. 2 is a rear view of the apparatus of FIG. 1.

The drawings show the rear housing 1 of a combine harvester containing a straw walker mechanism 2 that receives crop from a crop threshing mechanism (not shown) and feeds it rearwards. Loose grain in the threshed crop material falls through the straw walkers 3 and is passed to a grain cleaning mechanism (not shown) while the straw passes over the end of the straw walkers 3 into a further grain separating mechanism comprising a chute 4 leading down to a trough 5 covered by a wire comb 6, and a rotor 7 provided adjacent the rear end of the chute 4. The straw falls onto the chute 4 and passes down over the wire comb 6 and is fed out of the housing 1 with the aid of the rotor 7 that is driven counterclockwise as seen in FIG. 1. As the straw falls, loose grain is further released from the straw and passes through the comb 6 into the trough from where it is removed by a cross auger 8 and passes via a paddle elevator 9 to the grain cleaning mechanism.

The illustrated apparatus as described so far is known from U.K. patent specification No. 1 101 431.

The rotor 7 is carried between the lower ends of a pair of downwardly extending arms 10 that are pivotally connected to the housing 1 at their upper ends so as to allow the rotor to be swung backwards and forwards between a number of different settings. FIG. 1 shows the rotor in full lines in its forwardmost setting and in broken lines in its rearmost setting and intermediate settings.

An important function of the rotor is to ensure a uniform thickness of the material fed over the comb 6. Adjustment of the setting of the rotor relative to the comb allows this thickness to be adjusted for maximum grain separation as well as for crop bulk to avoid blockages.

The shaft 11 of the rotor 7 is supported at each end in a bearing 12 connected to the respective rotor support arm 10. The upper ends of the arms 10 are also connected by a tube 13 therebetween. The pivot of the arms 10 is formed by a shaft 14 that is rotatable in plane bearing plates 15 connected to the outside of the side walls 16 of the housing 1. The shaft 14 passes through apertures 17 in the arms 10 and is connected to each arm by a plate 18 that is fastened to the arm below the shaft at 19 and carries a sleeve 20 through which the shaft 14 passes and which is keyed to the shaft by a tapered pin 21.

A rotor adjustment arm 22 is connected to a sleeve 23 that is keyed by a tapered pin 24 to the outer end of the shaft 14 on the outside of the housing side wall 16. The adjustment arm 22 extends downwards alongside the adjacent rotor support arm 10 and carries a handle 25 at its lower end by which the arms 10 and rotor 7 can be swung backwards and forwards to any desired setting. A releasable fastener 26 in the form of a screw is provided to secure the rotor in each of its settings, the screw 26 being inserted through an aperture 27 in the adjustment arm, one of a number of selected apertures 28 in the side wall 16 of the housing and engaging a nut 29 secured to the rotor support arm 10.

If desired a tapered body portion can be provided on the screw 26 so as to co-operate with the edges of the selected aperture 28 and give an angular self alignment action between the two arms 10 and 22.

An adjustment arm 22' is similarly provided on the opposite side of the rotor, together with a similar releasable fastener 26' to engage an aperture 27' in the adjustment arm and one of a number of corresponding apertures 28' in the wall 16 and a nut 29' secured to the adjacent rotor support arm 10.

The rotor drive mechanism comprises a V-belt pulley 30 that is concentric with the sleeve 23 and is supported by a bearing 31 connected through bolts 32 to the adjustment arm 22.

A V-belt pulley 33 is similarly supported at the lower end of the adjustment arm by a bearing 34 and a V-belt 35 couples both pulleys 30, 33 and is tensioned by a pulley 36 that is adjustably supported in a slotted guide 37 connected to the adjustment arm 22 between the two pulleys 30, 33.

A tubular spindle 38 is insertable through the lower pulley 33, and apertures in the adjustment arm 22, side wall 16 and rotor support arm 10, and is engageable over a drive spigot 39 on the end of the shaft 11 of the rotor. The spigot 39 is shaped to key with the spindle 38, and a shaped head 40 on the spindle keys between lugs 41 provided on the pulley 33. A screw 42 is insertable through the spindle 38 and engages a threaded hole 43 in the spigot 39 to retain the spindle in place.

FIG. 3 of the drawings is a side elevation showing the V-belt 35 passing overthe pulleys 30, 33 and past the tensioner pulley 36. It also shows the input drive belt 44 that drives the upper pulley 30 and a pulley 45 connected to the grain collecting auger 8 and the elevator 9 associated with the grain collecting chute 5. The main drive pulley 46 is driven from the crankshaft 47 that operates the straw walkers 2.

A crop deflector arrangement is provided within the housing 1 above the rotor 7 so as to deflect crop downwards to the rotor and prevent it from passing out of the combine over the top of the rotor. This deflector arrangement is made adjustable to accommodate the different settings of the rotor and to feed crop to the rotor in each case. As shown in FIG. 1, an upper fixed baffle 48 is provided that extends downwards and rearwards from the top of the housing, and two relatively foldable baffles 49 and 50 are provided between the fixed baffle 48 and the rear wall 51 of the housing. The upper baffle 49 is located so as to pivot and slide relative to the lower edge of the fixed baffle 48, and the lower baffle 50 is pivoted about a transverse axis 52 adjacent the lower edge of the wall 51. A tension spring 53 holds these two baffles 49 and 50 in pivoting sliding engagement at 54 as they move between different settings corresponding to those of the rotor.

The baffle 49 is formed in three relatively angled sections 49', 49'' and 49''' so that the lower sections 49'', 49''' form a constriction above the rotor in all of its settings. The upper section 49' lies above and behind the guide 48 in the forwardmost setting, and moves downwards and pivots rearwards to the rearmost setting. The lower baffle 50 simply swings rearwards towards the rear wall 51.

As shown in FIG. 1, the rotor 7 and crop baffle arrangement is shown in its forwardmost position. To change this setting, the baffle 50 is released and swung rearwards about its axis 52 and secured in a new intermediate position or the rearmost position as shown in broken lines in FIG. 1. Movement of the baffle 50 automatically causes the baffle 49 to move to a corresponding new position. The rotor drive is then disconnected by withdrawing the screw 42 and spindle 38 from the lower pulley 32. The rotor support arms 10 are released by removing the screws 26 at each side, and the rotor is then moved to its new intermediate position or rearmost position using the adjustment arms 22. In its new position the aperture 27 in each arm 22 is aligned with a corresponding one of the set of apertures 28 in the housing side wall 16, and the screw 26 is re-inserted to hold the arms and rotor in position. The drive can then be reconnected by re-inserting the spindle 38 and holding screw 42 through the pulley 32 and a corresponding one of a set of apertures 57 in the housing side wall 16.

In a modified arrangement the baffles 49 and 50 may be conveniently linked to the rotor support arms 10 so that movement of the baffles is linked directly with movement of the rotor.

As described above, the action of the straw in falling from the ends of the straw walkers 3 aids the release of threshed grain from the straw, this grain being collected in the trough 5. In order to further assist release of the threshed grain from the straw, a plurality of elongate elements 55 such as wire fingers are provided that are spaced laterally across the end of each straw walker 3 and project rearwards beyond the end of the straw walkers above the chute 4. Preferably, these fingers 55 are inclined downwards, at least over their end portions 56. These fingers 55 tend to cause additional loosening of the straw before it falls freely, and thereby assists release of the grain.

I claim:

1. Apparatus for recovering grain from a mixture of grain and straw in a combine harvester comprising a conveyor capable of conveying a mixture of grain and straw in a generally horizontal direction to a discharge end; a chute arranged so that said mixture discharged from the conveyor falls onto the chute, the chute having a floor that is imperforate to the passage of grain through it and is downwardly inclined and projects beyond said discharge end in the feeding direction of the conveyor; a trough covered by a grille provided at or adjacent to the lower end of the chute and adapted so that when the mixture of grain and straw passes down the chute grain is collected by the trough and straw passes over it; and a rotor provided above and adjacent to the rear end of the chute and driven so as to assist the discharge of material from the apparatus, characterised in that the rotor (7) is so that it is adjustable towards and away from the chute (4) to vary the space therebetween for different types of crop and crop conditions.

2. The apparatus as claimed in claim 1 characterised in that the rotor (7) is carried between the lower ends of a pair of downwardly extending arms (10) that are pivotally supported at their upper ends (14) so as to allow the rotor (7) to be swung backwards and forwards between a number of different settings.

3. The apparatus as claimed in claim 1 or 2 characterised in that the rotor (7) is driven by a drive mechanism comprising an adjustment arm (22) which is mounted alongside one of the rotor support arms (10) so as to pivot with said arm about the same upper pivot axis (14) and which carries an upper drive pulley or wheel (30) that is rotatable about said upper pivot axis (14) and a lower drive pulley or wheel (33) that is rotatable about the axis of the rotor (7), the two drive pulleys or wheels (30, 33) being coupled so that an input drive (44) to the upper pulley (30) serves to drive the lower pulley (33), and a releasable drive coupling (38) being provided between the lower pulley (33) and the rotor (7).

4. The apparatus as claimed in claim 3 characterised in that the releasable drive coupling (38) takes the form of an axially insertable spindle that keys the lower pulley and rotor together.

5. Apparatus as claimed in claim 1 characterised in that it includes a housing (1) within which the conveyor (2), chute (4), trough (5) and rotor (7) are mounted and which includes crop deflector means (48, 49, 50) that is adjustable with the rotor (7) and serves to direct crop from the conveyor (2) downwards to the rotor (7) so that the crop passes between the chute (4) and rotor (7) downwards out of the housing (1).

6. Apparatus as claimed in claim 5 further characterised in that the crop deflector means comprises two baffles (49, 50) that are relatively foldable about a transverse axis, the lower baffle (50) being pivoted about a transverse axis (52) along its lower edge and the upper baffle (49) being guided so as to move in a set manner with pivotal movement of the lower baffle (50).

7. Apparatus as claimed in claim 6 further characterised in that the upper baffle (49) is formed with two relatively angled portions (49'', 49''') and is located so as to form a constriction above the rotor (7) in all of its settings.

8. Apparatus as claimed in claim 3 further characterised in that it includes a housing (1) having side walls (16) between which the conveyor (2), chute (4), trough (5) and rotor (7) are mounted, the adjustment arm (22) being mounted outside of the housing (1) alongside one side wall (16) and releasable connection means (26) being provided to secure the adjustment arm (22) in each of a dnumber of selectable angular positions corresponding to different settings of the rotor (7) relative to the chute (4).

9. Apparatus as claimed in claim 1 characterised in that a plurality of elongate elements (55) are spaced laterally across the discharge end of the conveyor (2) and project beyond the end of the conveyor.

10. Apparatus as claimed in claim 9 further characterised in that the conveyor (2) comprises straw walkers (3) and the elongate elements wire fingers (55).

11. Apparatus as claimed in claim 9 or 10 further characterised in that the elongate elements (55) project downwards at least over a portion of their free ends (56).

* * * * *